United States Patent
Oh et al.

(10) Patent No.: US 9,240,592 B2
(45) Date of Patent: Jan. 19, 2016

(54) POSITIVE-ELECTRODE ACTIVE MATERIAL FOR ELEVATION OF OUTPUT AND LITHIUM SECONDARY BATTERY INCLUDING THE SAME

(75) Inventors: Song Taek Oh, Daejeon (KR); Sun Kyu Kim, Daejeon (KR); Geun Chang Chung, Daejeon (KR); Keun Wan An, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 13/167,475

(22) Filed: Jun. 23, 2011

(65) Prior Publication Data

US 2011/0311872 A1 Dec. 22, 2011

Related U.S. Application Data

(63) Continuation of application No. PCT/KR2011/001300, filed on Feb. 24, 2011.

(30) Foreign Application Priority Data

Feb. 24, 2010 (KR) .................. 10-2010-0016853

(51) Int. Cl.
*H01M 4/505* (2010.01)
*H01M 4/36* (2006.01)
(Continued)

(52) U.S. Cl.
CPC ............. *H01M 4/505* (2013.01); *H01M 4/13* (2013.01); *H01M 4/364* (2013.01); *H01M 4/525* (2013.01); *H01M 4/5825* (2013.01);
(Continued)

(58) Field of Classification Search
USPC ...................................................... 429/218.1
See application file for complete search history.

(56) References Cited

U.S. PATENT DOCUMENTS 7,811,708 B2 * 10/2010 Lampe-Onnerud et al. ................ 429/231.95
8,449,792 B2 * 5/2013 Chang et al. ............. 252/519.14
(Continued)

FOREIGN PATENT DOCUMENTS

JP 2007-250299 A 9/2007
JP 2009-503766 A 1/2009
(Continued)

OTHER PUBLICATIONS

Kim et al., "Carbon coatings with olive oil, soybean oil and butter on nano-LiFePO4", Journal of Power Sources, vol. 167, 2007, pp. 524-528.

(Continued)

*Primary Examiner* — Patrick Ryan
*Assistant Examiner* — Lucas J. O'Donnell
(74) *Attorney, Agent, or Firm* — Birch, Stewart, Kolasch & Birch, LLP (57) ABSTRACT

A lithium secondary battery having improved output characteristics is provided. A high voltage mixed positive electrode active material has an even profile without causing a rapid voltage drop over the entire SOC area by improving a rapid voltage drop phenomenon occurring due to the difference between the operation voltages of mixed lithium transition metal oxides, and improves output characteristics at a low voltage. The lithium secondary battery includes the mixed positive electrode active material. In particular, the lithium secondary battery can sufficiently satisfy the required conditions such as output characteristics, capacity, stability, and the like, when it is used as a power source of a midsize or large device such as an electric vehicle.

12 Claims, 4 Drawing Sheets

(51) Int. Cl.
*H01M 4/13* (2010.01)
*H01M 4/58* (2010.01)
*H01M 4/525* (2010.01)
*H01M 4/62* (2006.01)
*H01M 10/052* (2010.01)

(52) U.S. Cl.
CPC ............ *H01M 4/625* (2013.01); *H01M 10/052* (2013.01); *Y02E 60/122* (2013.01); *Y02P 70/54* (2013.01); *Y02T 10/7011* (2013.01); *Y10T 29/49108* (2015.01)

(56) References Cited

U.S. PATENT DOCUMENTS

| | | | | |
|---|---|---|---|---|
| 2002/0114995 | A1* | 8/2002 | Thackeray et al. | 429/224 |
| 2002/0136954 | A1* | 9/2002 | Thackeray et al. | 429/231.1 |
| 2004/0157126 | A1* | 8/2004 | Belharouak et al. | 429/231.8 |
| 2005/0266299 | A1* | 12/2005 | Nishiyama et al. | 429/50 |
| 2006/0051671 | A1* | 3/2006 | Thackeray et al. | 429/224 |
| 2006/0134527 | A1* | 6/2006 | Amine et al. | 429/326 |
| 2006/0199080 | A1* | 9/2006 | Amine et al. | 429/326 |
| 2006/0222946 | A1* | 10/2006 | Okada et al. | 429/224 |
| 2007/0037043 | A1 | 2/2007 | Chang et al. | |
| 2008/0070122 | A1 | 3/2008 | Park et al. | |
| 2008/0085452 | A1 | 4/2008 | Park | |
| 2008/0280203 | A1* | 11/2008 | Yada et al. | 429/220 |
| 2008/0311432 | A1 | 12/2008 | Park et al. | |
| 2009/0075165 | A1 | 3/2009 | Park et al. | |
| 2009/0081529 | A1* | 3/2009 | Thackeray et al. | 429/52 |
| 2010/0323244 | A1* | 12/2010 | Chiang et al. | 429/220 |
| 2011/0193013 | A1* | 8/2011 | Paulsen et al. | 252/182.1 |
| 2012/0097905 | A1* | 4/2012 | Chang et al. | 252/519.14 |

FOREIGN PATENT DOCUMENTS

| | | |
|---|---|---|
| KR | 10-2008-0026316 A | 3/2008 |
| KR | 10-2008-0031616 A | 4/2008 |
| KR | 10-2008-0109298 A | 12/2008 |
| KR | 10-2009-0030087 A | 3/2009 |

OTHER PUBLICATIONS

EPO Extended Search Report for Appl. No. 11747723.2 dated Jul. 4, 2014.

Thackeray, M.M. et al, "Advances in manganese-oxide 'composite' electrodes for lithium-ion batteries," Journal of Materials Chemistry, 2005, vol. 15, pp. 2257-2267.

* cited by examiner

POSITIVE-ELECTRODE ACTIVE MATERIAL FOR ELEVATION OF OUTPUT AND LITHIUM SECONDARY BATTERY INCLUDING THE SAME

CROSS REFERENCE TO RELATED APPLICATIONS

This application is a Continuation of copending PCT International Application No. PCT/KR2011/001300 filed on Feb. 24, 2011, which claims the benefit of Patent Application No. 10-2010-0016853 filed in Republic of Korea on Feb. 24, 2010. The entire content of each of the above documents is hereby incorporated by reference into the present application.

BACKGROUND OF THE INVENTION

1. Field of the Invention

The present invention relates to a mixture positive-electrode active material having an enlarged available state of charge (SOC) area and improved output characteristics at a low voltage level, a lithium secondary battery including the same, and a method for manufacturing the same.

2. Related Art

As the development of techniques and demand for mobile devices are increasing, the demand of secondary batteries as an energy source has been rapidly growing. Among secondary batteries, a lithium secondary battery having a high energy density and voltage, a long cycle life span, and a low self-discharge rate, has been commercialized and widely used. Also, as people are increasingly interest in the environment issues, research for an electric vehicle, a hybrid electric vehicle, or the like, which may replace the vehicles, such as a gasoline vehicle, a diesel vehicle, or the like, using fossil fuel, one of major causes of air pollution, has been greatly conducted. Recently, research into the use of a lithium secondary battery having a high energy density and discharge voltage as a power source of an electric vehicle, a hybrid electric vehicle, or the like, is actively ongoing and a lithium secondary battery is partially in a commercialization stage.

In particular, researches for developing a positive electrode material of a large capacity lithium secondary battery to be used for an electric vehicle are comprehensively carried out to replace currently used $LiCoO_2$.

In case of $LiCoO_2$, the existing typical positive material, has reached its limit in an increase in an energy density and a practical use of output characteristics, and in particular, when $LiCoO_2$ is used in a high energy density application field, its structure is denatured at a high charge state due to a structural instability and oxygen in the structure is discharged to cause an exothermic reaction with electrolyte in a battery to mainly cause a battery explosion. Thus, in order to improve the instability of $LiCoO_2$, the use of a lithium-containing manganese oxide such as $LiMnO_2$ having a layered crystal structure, $LiMn_2O_4$ having a spinel crystal structure, or the like, has been considered, and recently, a great deal of researches into the use of three-component system layered oxides of $LiNi_xMn_yCo_{1-x-y}O_2$ have been done.

$Li[Ni_{1/3}Co_{1/3}Mn_{1/3}]O_2$, the most typical layered oxide among the three-component layered oxides, is changed from $Ni^{2+}$ to $Ni^{3+}$ or $Ni^{4+}$ according to the depth of charge when charging is performed. However, unlike stable $Ni^{2+}$, $Ni^{3+}$ or $Ni^{4+}$ (in particular $Ni^{4+}$) loses lattice oxygen so as to be reduced to $Ni^{2+}$ due to instability, and the lattice oxygen reacts with electrolyte to change the surface qualities of an electrode or increase a charge transfer impedance of the surface of the electrode to reduce the capacity or degrade high rate capability.

In order to improve the problem of the three-component layered oxide, research for mixing a metal oxide having an olivine structure to the 3-component positive electrode active material has been conducted, but the metal oxide having the olivine structure has a low reversible capacity and low output characteristics due to low electric conductivity, having a problem in that a volume energy density is low in spite of the advantages of a low cost and high security. In particular, when the three-component layered oxide and the metal oxide having the olivine structure are mixed, a rapid voltage drop is caused in the vicinity of 3.6 V to 3.4 V during discharging due to the difference in the operation voltage, so the output is sharply dropped in a state of charge (SOC) area of the corresponding portion.

Japanese Laid Open Publication No. 2001-307730 discloses a non-aqueous electrolyte secondary battery using a mixture, which is obtained by a second lithium compound such as a lithium-containing cobalt oxide, a lithium-containing nickel cobalt oxide, or the like, to a first lithium compound including a lithium-containing olivine type phosphate, as a positive electrode active material. However, the lithium secondary battery according to this document still has the problem of degradation of the instantaneous output because there is a portion in which voltage is rapidly dropped at an end portion of an operation voltage of the second lithium compound due to the difference between the operation voltages of the two mixed materials.

These problems may possibly become serious when the lithium secondary battery is used as a power source of mid-size and large devices such as an electric vehicle in which maintaining of the output in the available SOC area is essential, so research into a secondary battery which does not have a rapid output drop in the available SOC area while maintaining a high level of security and exhibits a high output even at a low SOC area is urgently required.

SUMMARY OF THE INVENTION

Therefore, in order to address the above matters, the inventors of the present application conducted in-depth research and various experiments to notice that a rapid voltage drop phenomenon of the positive electrode active material obtained by mixing the 3-component layered oxide and the metal oxide having the olivine structure occurs in the vicinity of the boundary of the operation voltages of the two oxides, and thus confirm that an implementation of a positive electrode active material in which the ranges of the operation voltages are not completely discriminated would solve the problems of the related art and provide a high capacity secondary battery having improved output characteristics at a low voltage, thus conceiving the present invention.

It is, therefore, an object of the present invention to provide a mixed positive electrode active material obtained by mixing a layered lithium manganese oxide having a voltage profile appearing to below a 3V, instead of a 3-component layered oxide, and a metal oxide having an olivine structure.

Another object of the present invention is to provide a lithium secondary battery including the mixed positive electrode active material.

Still another object of the present invention is to provide a method for manufacturing the lithium secondary battery including the mixed positive electrode active material.

In order to achieve the above objects, there is provided a lithium secondary battery including: a mixed positive electrode active material obtained by mixing a lithium manganese oxide represented by [Chemical Formula 1] shown below and a metal oxide having an olivine structure represented by [Chemical Formula 2] shown below and charged at a voltage of 4.45 V or higher based on a positive electrode potential.

$$aLi_2MnO_3\text{-}(1\text{-}a)LiMO_2 \qquad \text{[Chemical Formula 1]}$$

wherein 0<a<1, and M is any one selected from the group consisting of Al, Mg, Mn, Ni, Co, Cr, V, and Fe, or two or more of them are simultaneously applied.

$$Li_xM_yM'_zXO_4 \qquad \text{[Chemical Formula 2]}$$

Wherein M and M' are one or more selected from among transition metal elements, X is any one selected from the group consisting of P, Si, S, As, Sb, and any of their combinations, and x+y+z=2.

Also, the metal oxide having the olivine structure represented by Chemical Formula 2 may be $LiFePO_4$.

In charging at the voltage of 4.45 V or higher based on the positive electrode potential, charging may be performed at a formation step, or in a few cycles or in every cycle following the formation step.

The mixed positive electrode active material may include the metal oxide having the olivine structure by 5 to 50 weight parts.

The mixed positive electrode active material may include the metal oxide having the olivine structure by 10 to 40 weight parts.

The metal oxide having the olivine structure in the mixed positive electrode active material may be coated with a conductive material.

The conductive material may be a carbon-based material.

The mixed positive electrode active material may further include any one or two or more lithium-containing metal oxides selected from the group consisting of a lithium cobalt oxide, a lithium nickel oxide, a lithium manganese oxide, a lithium cobalt-nickel oxide, a lithium cobalt-manganese oxide, a lithium manganese-nickel oxide, a lithium cobalt-nickel-manganese oxide, and an oxide formed by substituting these with other elements or formed by doping other element(s) therein.

The other element(s) may be any one or two or more elements selected from the group consisting of Al, Mg, Mn, Ni, Co, Cr, V, and Fe.

The lithium-containing metal oxide may be included to be 50 wt % or less over the total weight of the mixed positive electrode active material.

The lithium secondary battery may include: a positive electrode mix including a conductive material, a binder, and a filler, besides the mixed positive electrode active material.

The lithium secondary battery may be used as a unit cell of a battery module, a power source of a midsize or large device.

The midsize or large device may be a power tool; an electric vehicle including an electric vehicle (EV), a hybrid electric vehicle (HEV), and a plug-in hybrid electric vehicle (PHEV); an electric two-wheeled vehicle including an E-bike and an E-scooter; an electric golf cart; an electric truck; or an electric commercial vehicle or a power storage system.

In order to achieve the above objects, there is also provided a method for manufacturing a lithium secondary battery, including: fabricating a mixed positive electrode active material by mixing a lithium manganese oxide represented by [Chemical Formula 1] shown below and a metal oxide having an olivine structure represented by [Chemical Formula 2] shown below; manufacturing a lithium secondary battery including the mixed positive electrode active material; and a formation step of charging the lithium secondary battery at a voltage of 4.45 V or higher based on a positive electrode potential.

$$aLi_2MnO_3\text{-}(1\text{-}a)LiMO_2 \qquad \text{[Chemical Formula 1]}$$

wherein 0<a<1, and M is any one selected from the group consisting of Al, Mg, Mn, Ni, Co, Cr, V, and Fe, or two or more of them are simultaneously applied.

$$Li_xM_yM'_zXO_4 \qquad \text{[Chemical Formula 2]}$$

wherein M and M' are one or more selected from among transition metal elements, X is any one selected from the group consisting of P, Si, S, As, Sb, and any of their combinations, and x+y+z=2.

In the formation step, the lithium secondary battery may be charged at a voltage of 4.6 V or higher based on the positive electrode potential.

The metal oxide having the olivine structure represented by Chemical Formula 2 may be $LiFePO_4$.

The formation step may be performed in every several cycles or in every cycle.

The mixed positive electrode active material may include the metal oxide having the olivine structure by 5 to 50 weight parts.

The fabricating of the mixed positive active material may include coating the metal oxide having the olivine structure with a conductive material.

The conductive material may be a carbon-based material.

According to the exemplary embodiments of the present invention, the lithium secondary battery including a mixed positive electrode active material uses two oxides whose operation voltage range are connected without an interruption, whereby a continuously even voltage profile without a rapid voltage drop in the whole SOC area can be obtained in the event of discharging, and an output degradation in a low SOC area can be improved. Thus, the lithium secondary battery can have extended available SOC area and excellent stability.

In particular, when the lithium secondary battery is used as a power source of a midsize or large device such as an electric vehicle, it can sufficiently satisfy the required conditions such as output characteristics, capacity, stability, and the like.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE EMBODIMENTS

To achieve the object of the present invention, the present invention provides a mixed positive electrode active material form by mixing a metal oxide having an olivine structure (referred to as an 'olivine', hereinafter) and a lithium manganese oxide having a layered structure with a potential plateau range when charging is performed at a relatively high voltage.

Exemplary embodiments of the present invention will now be described in detail.

The mixed positive electrode active material according to an exemplary embodiment of the present invention is formed by mixing a lithium manganese oxide which can exhibit a voltage profile of a voltage level lower than a 3.5 V so as to be connected to an operation voltage range of olivine, instead of a 3-component lithium transition metal oxide having a definitely discontinued from the operation voltage range of olivine, with olivine, thus preventing a rapid voltage drop phenomenon due to the difference between the operation voltage ranges.

To this end, the positive electrode active material according to an exemplary embodiment of the present invention is a mixed positive electrode active material obtained by mixing a lithium manganese oxide known to have a potential plateau voltage range when charging is performed at a voltage of 4.45 V or higher based on a positive electrode potential, and olivine.

The lithium manganese oxide can be represented by [Chemical Formula 1] shown below:

[Chemical Formula 1]

wherein 0<a<1, and M is any one selected from the group consisting of Al, Mg, Mn, Ni, Co, Cr, V, and Fe, or two or more of them are simultaneously applied.

Namely, the lithium manganese oxide represented by [Chemical Formula 1] includes Mn as essential transition metal, and in this case, the content of Mn is greater than that of the other metals, excluding lithium. Also, the lithium manganese oxide exhibits high capacity in the event of overcharging at a high voltage.

Also, the lithium manganese oxide exhibits a voltage profile long up to a 3.5 V or lower in the event of discharging, so when the lithium manganese oxide is mixed with olivine, the operation voltage ranges are not disconnected.

Mn included as an essential transition metal in the lithium manganese oxide represented by [Chemical Formula 1] is required to be included in large quantities compared with the content of the other metals (excluding lithium). In detail, Mn is 50 mol % to 80 mol % based on the total amount of the metals excluding lithium.

If the content of Mn is too little, the stability would deteriorate, a manufacturing cost would be increased, and the characteristics peculiar only to the lithium manganese oxide cannot be exhibited. Conversely, if the content of Mn is too much, the cycle stability would deteriorate. The lithium manganese oxide has a certain range of potential plateau over an oxidation/reduction potential range appearing by a change in the oxidation number of constituents. In detail, when charging is performed at 4.45 V, preferably, at a relatively higher voltage of 4.5 V or higher, the lithium manganese oxide exhibits a potential plateau range along with an excessive amount of oxygen gas in the vicinity of 4.5 V to 4.8 V, and has a high capacity of up to about 250 mAh/g.

The fabrication method of the lithium manganese oxide is not particularly limited and can be fabricated by using a conventionally known method. In general, the respective metal salts included in the lithium manganese oxide are coprecipitated to fabricate $MO_2$ (M=Mn, Ni, Co, etc.), which is then synthesized with $Li_2CO_3$, LiOH, or the like, through a sold-state reaction at a high temperature, but the present invention is not limited thereto. In other methods, an Mn oxide, Ni oxide, Co oxide, and the like, may be solid-state-reacted along with $Li_2CO_3$, LiOH, or the like, at a time at a high temperature, or lithium salt may be coprecipitated when the metal salts are coprecipitated to fabricate the lithium manganese oxide.

Meanwhile, the olivine used according to the present exemplary embodiment may be represented by [Chemical Formula 2] shown below:

[Chemical Formula 2]

wherein M and M' are one or more selected from among transition metal elements,

X is any one selected from the group consisting of P, Si, S, As, Sb, and any of their combinations, and x+y+z=2.

In addition, in order to assist an output in the 3V range of the lithium manganese oxide of Chemical Formula 1 to improve the output degradation at a low voltage, the olivine represented by Chemical Formula 2 may use $LiFePO_4$ having a relatively low charge potential.

$LiFePO_4$ has a theoretical capacity of 170 mAh/g and a standard reduction potential of 3.4V. This voltage is not so high as to decompose electrolyte but allows for maintaining energy density.

However, $LiFePO_4$ has an insufficient charging/discharging behavior due to its low electric conductivity, so in general, a form obtained by coating a conductive material on a surface of $LiFePO_4$ is widely used, and thus, the present invention includes the form obtained by coating a conductive material on the surface of $LiFePO_4$, as well as pure $LiFePO_4$.

The conductive material is not particularly limited so long as it has excellent electric conductivity and does not cause a side reaction in an internal environment of the secondary battery. In particular, a carbon-based material having high conductivity is preferred.

The mixed positive electrode active material according to the present exemplary embodiment is characterized in that it includes the lithium manganese oxide of Chemical Formula 1 and the olivine of Chemical Formula 2, and a content ratio may not be limited. Preferably, the content of the olivine may be 5 to 50 weight parts over the total amount of the mixed positive electrode active material, and more preferably, the content of the olivine may be 10 to 40 weight parts.

If the content of the olivine is less than 5 weight parts, the role of the olivine could not be sufficiently exhibited to cause a problem of stability of the secondary battery, and if the content of the olivine is more than 50 weight parts, there would possibly have a limitation in obtaining a high capacity of the entire positive electrode.

The positive electrode active material according to the present exemplary embodiment does not have an apparent boundary of an operation voltage, so there is no rapid voltage drop over the entire SOC area, and when $LiFePO_4$ is used as the olivine, $LiFePO_4$ assists the output in a low SOC area of the lithium manganese oxide to thus provide a positive electrode active material having improved output degradation at the low voltage.

Besides, the lithium manganese oxide having a potential plateau voltage range and exhibiting the voltage profile to below 3.5 V when charging is performed at a high voltage of 4.45 V or higher based on the positive electrode potential and the olivine, the mixed positive electrode active material according to the present exemplary embodiment may further include the lithium-containing metal oxides as follows.

Namely, the additionally included lithium-containing metal oxides are various active materials known in the art, including lithium cobalt oxide, a lithium nickel oxide, a lithium manganese oxide, a lithium cobalt-nickel oxide, a lithium cobalt-manganese oxide, a lithium manganese-nickel oxide, a lithium cobalt-nickel-manganese oxide, and an oxide formed by substituting these with other elements or formed by doping other element(s) therein. The other element(s) may be any one or two or more elements selected from the group consisting of Al, Mg, Mn, Ni, Co, Cr, V, and Fe.

The lithium-containing metal oxide may be included to be 50 wt % or less over the total weight of the mixed positive electrode active material in order to obtain the effect of the present invention.

In order to activate the lithium manganese oxide exhibiting a high capacity when charging is performed at a voltage of 4.45 V or higher based on the positive electrode potential, the lithium secondary battery including the mixed positive electrode material according to the present exemplary embodiment is charged at a voltage of 4.45 V or higher based on the positive electrode potential, and preferably, charged at a voltage of 4.5 V or higher.

The lithium secondary battery according to the present exemplary embodiment has a potential plateau range in the vicinity of 4.45 V through the foregoing activation process, and exhibits a high capacity in the potential plateau range as well as generating oxygen.

In addition, in a discharging process, the lithium secondary battery has continuously even discharge characteristics without having a rapid voltage drop or an output degradation, and has improved output degradation phenomenon by the output assistance of the olivine.

The activation process method for charging the lithium secondary battery at a relatively high voltage of 4.45 V or higher based on the positive electrode potential is not particularly limited, and a charging method known in the art is used.

In this case, the charging at the high voltage may be performed in every operation cycle, or may be performed one time or several times in the battery formation step in consideration of stability and fairness. In order to perform charging in every cycle, electrolyte which can be stably operated at the high voltage of 4.45 V or higher is required, but it is not easy to implement such electrolyte at a current technical stage.

Also, after the charging operation finished, since gas such as oxygen, or the like, is generated in large quantities, so preferably, a degassing process is performed after the formation step including the charging process.

The present invention also provides a positive electrode mix including the foregoing mixed positive electrode active material.

Besides the mixed positive electrode active material, the positive electrode mix may selectively include a conductive material, a binder, a filler, and the like.

The conductive material is generally added to be 1 wt % to 50 wt % based on the total weight of the mixed positive electrode active material. The conductive material is not particularly limited so long as it has conductivity without causing a chemical change in the battery. The conductive material may include, for example, graphite such as natural graphite, artificial graphite, or the like; carbon black, such as acetylene black, Ketjen black, channel black, furnace black, lamp black, summer black; conductive fiber such as carbon fiber, metal fiber, or the like; metal powder such as fluorocarbon, aluminum, nickel powder, or the like; conductive whisky such as zinc oxide, calium titanic acid, or the like; a conductive oxide such as titanium dioxide, or the like; a conductive material such as a polyphenylene derivative, or the like. According to circumstances, a second coated layer having conductivity may be added to the mixed positive electrode active material, to thus omit the addition of the conductive material.

The binder is a component assisting the combining between the active material and the conductive material, or the like, and the combining with respect to a current collector. In general, the binder is generally added by 1 wt % to 50 wt % based on the total weight of the mixed positive electrode active material. The binder may include, for example, polyvinylidene difluoride, polyvinyl alcohol, carboxymethylcellulose (CMC), starch, hyddroxypropylcellulose, regenerated cellulose, polyvinylpyrrolidone, tetrafluoreethylene, polyethylene, polypropylene, ethylene-propylene-diene terpolymer (EPDM), sulfonic EPDM, styrene butylene rubber, fluorinated rubber, various polymers, and the like.

The filler is a component for restraining the positive electrode from expanding, which is selectively used. The filler is not particularly limited so long as it is a fibrous material without causing a chemical change in the battery. The filter may include, for example, an olefin-based polymer such as polyethylene, polypropylene, or the like; a fibrous material such as glass fiber, carbon fiber, or the like.

The present invention also provides a positive electrode in which the positive electrode mix is applied to the current collector.

The positive electrode for a secondary battery may be fabricated by applying slurry created by mixing the positive electrode mix, such as the mixed positive electrode active material, the conductive material, the binder, the filler, and the like, applied to a positive electrode current collector, in a solvent such as NMP, or the like, to a negative electrode current collector, and then drying and rolling the same.

The positive electrode current collector generally has a thickness ranging from 3 μm to 500 μm. The positive electrode current collector is not particularly limited so long as it has high conductivity without causing a chemical change in the battery. The positive electrode current collector may include, for example, stainless steel, aluminum, nickel, titanium, fired oxygen, or aluminum, or a current collector obtained by surface-treating aluminum or stainless steel with carbon, nickel, titanium, silver, or the like. The current collector may have fine depressions and protrusions formed on its surface to enhance adhesive strength of the positive electrode active material, or may have various forms such as a film, a sheet, a foil, a net, a porous body, a foaming agent, a non-woven fabric body, and the like.

The present invention also provides a lithium secondary battery including the positive electrode, a negative electrode, a separator, and a lithium salt-containing non-aqueous electrolyte.

The negative electrode may be fabricated by applying a negative electrode mix including a negative electrode active material to a negative electrode current collector and drying the same, and may further include the components as described above as necessary.

The negative electrode current collector generally has a thickness ranging from 3 μm to 500 μm. The negative electrode current collector is not particularly limited so long as it has conductivity without causing a chemical change in the corresponding battery. For example, the negative electrode current collector may include copper, stainless steel, aluminum, nickel, titanium, a carbon material, a form obtained by treating a surface of copper or stainless steel with carbon, nickel, titanium, silver, or the like, an aluminum-cadmium alloy, or the like. Also, like the positive electrode current collector, the negative electrode current collector may have fine depressions and protrusions formed on its surface to enhance adhesive strength of the positive electrode active material, or may have various forms such as a film, a sheet, a foil, a net, a porous body, a foaming agent, a non-woven fabric body, and the like.

The separator is interposed between negative electrodes. An insulating thin film having a high ion permeability and mechanical strength is used as the separator. The separator has a pore diameter generally ranging from 0.01 μm to 10 μm and a thickness generally ranging from 5 μm to 300 μm. As the separator, for example, olefin-based polymer such as chemical resistant and hydrophobic polypropylene, or the like; and a sheet, non-woven fabric, or the like, are used. When solid electrolyte, such as polymer, or the like, is used as the electrolyte, the solid electrolyte may also serve as the separator.

The lithium salt-containing non-aqueous electrolyte includes aqueous electrolyte and lithium salt. A non-aqueous organic solvent, an organic solid electrolyte, inorganic solid electrolyte, or the like, is used as the aqueous electrolyte.

As the non-aqueous organic solvent, for example, an aprotic organic solvent such as N-methyl-2-pyrrolidinone, propylele carbonate, ethylene carbonate, butylenes carbonate, dimethyl carbonate, diethyl carbonate, gamma-butylolactone, 1,2-dimethoxy ethane, tetrahydroxy franc, 2-methyl tetrahydrofuran, dimethylsulfoxide, 1,3-dioxoran, formamide, dimethylformamide, dioxoran, acetonitrile, nitromethane, formic acid methyl, methyl acetate, phosphoric acid triester, trimethoxy methane, a dioxoran derivative, sulfolane, methyl sulfolane, 1,3-dimethyl-2-imidazolidinone, a propylene carbonate derivative, a tetrahydrofuran derivative, ether, propionic acid methyl, propionic acid ethyl, or the like, may be used.

As the organic solid electrolyte, for example, a polyethylene derivative, a polyethylene, oxide derivative, a polypropylene oxide derivative, a phosphoric acid ester polymer, a poly agitation lysine, polyester sulfide, polyvinyl alcohol, Polyvinylidene difluoride (PVDF), a polymer including an ionic dissociable group may be used.

As the inorganic solid electrolyte, for example, nitride of Li such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, $Li_3PO_4$—$Li_2S$—$SiS_2$, halides, a sulfate, or the like, may be used.

The lithium salt is a material which can be easily dissolved in the non-aqueous electrolyte. As the lithium salt, for example, LiCI, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carbonic acid lithium, 4-phenyl boric acid lithium, imide, or the like, may be used.

In order to improve charging/discharging characteristics, flammability, or the like, for example, pyridine, triethylphosphite, triethanolamine, cyclic ether, ethylene diamine, n-glyme, hexa phosphoric acid tri amide, a nitrobenzene derivative, sulfur, quinonimin-dyes, N-substituted oxazolidinone, N,N-substituted imidazolidine, ethylene, glycol dialkyl ether, ammonium salt, pyrrol, 2-methoxy ethanol, aluminum trichloride, or the like, may be added to the non-aqueous electrolyte. According to circumstances, a halogen-containing solvent such as carbon tetrachloride, ethylene trifluoride, or the like, may be further included in order to provide non-inflammability, or carbon dioxide may be further included in order to improve high temperature preservation characteristics. The secondary battery according to an exemplary embodiment of the present invention can be used for a battery cell used as a power source of a small device, or may be also preferably used as a unit cell in a midsize or large battery module including a plurality of cells.

The midsize or large device may be, for example, a power tool; an electric vehicle including an electric vehicle (EV), a hybrid electric vehicle (HEV), and a plug-in hybrid electric vehicle (PHEV); an electric two-wheeled vehicle including an E-bike and an E-scooter; an electric golf cart; an electric truck; or an electric commercial vehicle or a power storage system.

Hereinafter, the present invention will now be described in more detail through embodiments, but the embodiments hereinafter are merely for illustrating the present invention and the scope of the present invention is not limited thereto.

Embodiment 1

Fabrication of Positive Electrode $LiFePO_4$ and $0.5Li_2MnO_3$-$0.5Li(Mn0.33Ni0.33Co0.33)O_2$ were mixed in the ratio of 3:7 which was determined to be 88 wt % of the total weight of the positive electrode mix, and 6 wt % of denka black as a conductive material and 6 wt % of PVDF as a binder were added to an NMP to create slurry. The slurry was applied to a positive electrode current collector and then rolled and dried to fabricate a positive electrode for a secondary battery.

Fabrication of Lithium Secondary Battery

The thusly fabricated positive electrode was included, a porous polyethylene separator was interposed between negative electrodes made of lithium metal, and lithium electrolyte was then injected to fabricate a coin type lithium secondary battery. The coin type lithium secondary battery was CC/CV-charged at 4.6 V based on a positive electrode potential and then discharged at 3V (C-rate=0.1 C).

COMPARATIVE EXAMPLE 1

The same process as that of Embodiment 1 was performed except that, after a lithium ion secondary battery was fabricated in the same manner as that of Embodiment 1, it was charged at 4.4 V based on a positive electrode potential in a formation step.

COMPARATIVE EXAMPLE 2

The same process as that of Embodiment 1 was performed except that $Li(Mn0.33Ni0.33Co0.33)O_2$, instead of, $0.5Li2MnO3$-$0.5Li(Mn0.33Ni0.33Co0.33)O_2$, was mixed.

COMPARATIVE EXAMPLE 3

The same process as that of Comparative Example 2 was performed except that, after a lithium ion secondary battery was fabricated in the same manner as that of Comparative Example, it was charged at 4.4 V based on a positive electrode potential in a formation step.

Charging and discharging characteristics in the 4.4 V to 3 V of the cells fabricated according to the Embodiment and respective Comparative Examples were checked at room temperature, and the results are shown in FIGS. 1 to 4.

Figure 1:
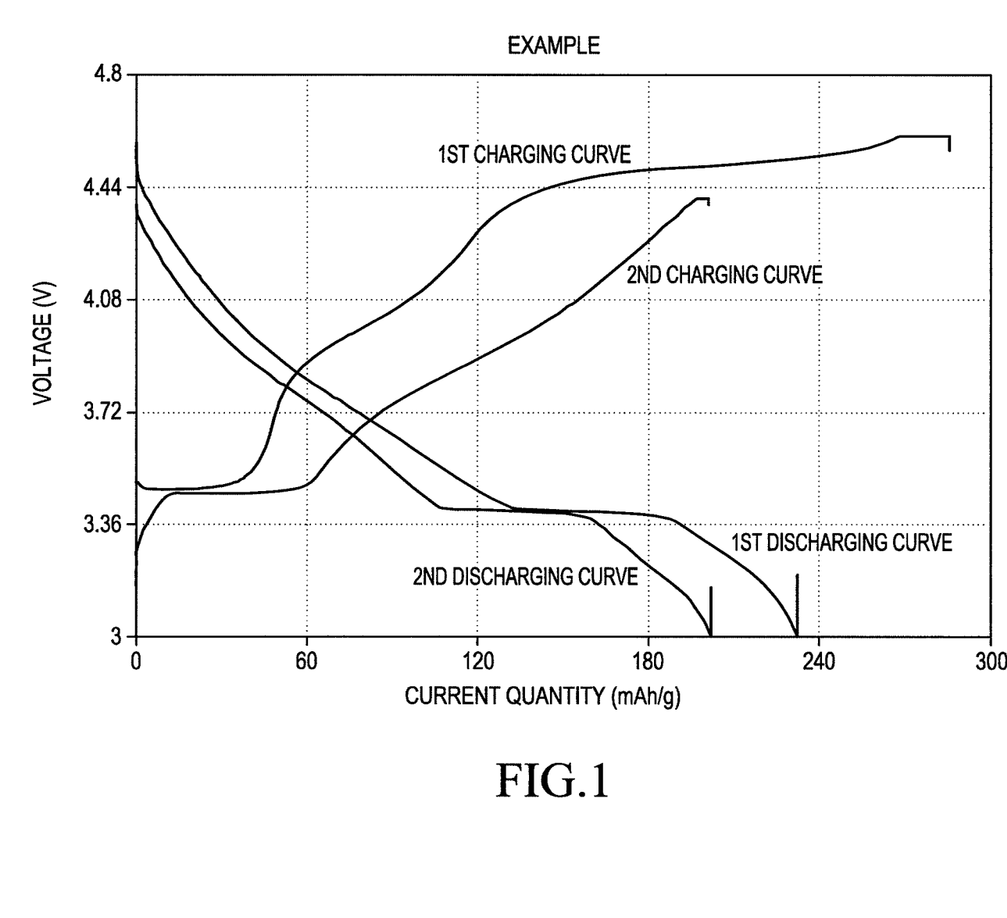
FIG. 1 is a graph showing tilts of a current-voltage change and a profile when a lithium secondary battery according to an exemplary embodiment of the present invention is discharged.

FIG. 1 shows the tilts of the current-voltage change and profiles in the 3 V to 4 V range when the secondary battery according to the Embodiment is discharged. The results of a second cycle after the formation step is also shown.

Figure 2:
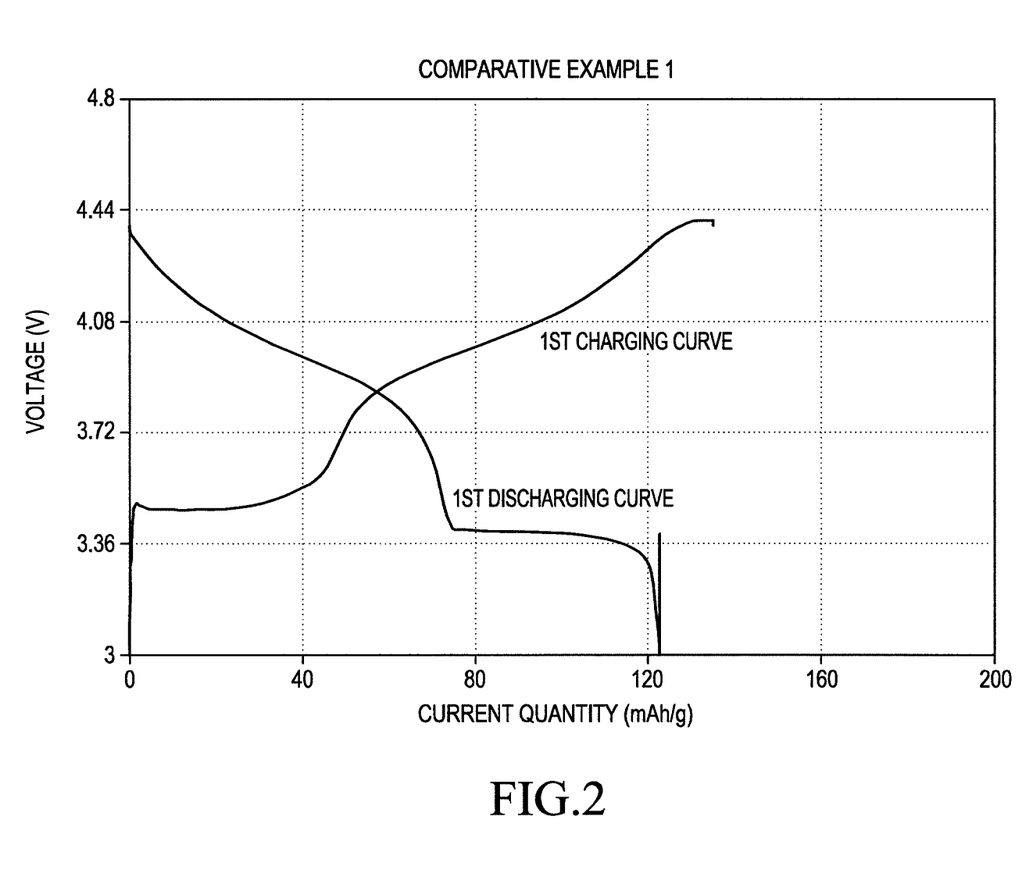
FIG. 2 is a graph showing tilts of a current-voltage change and a profile when a lithium secondary battery according to Comparative Example 1 of the present invention is discharged.
Figure 3:
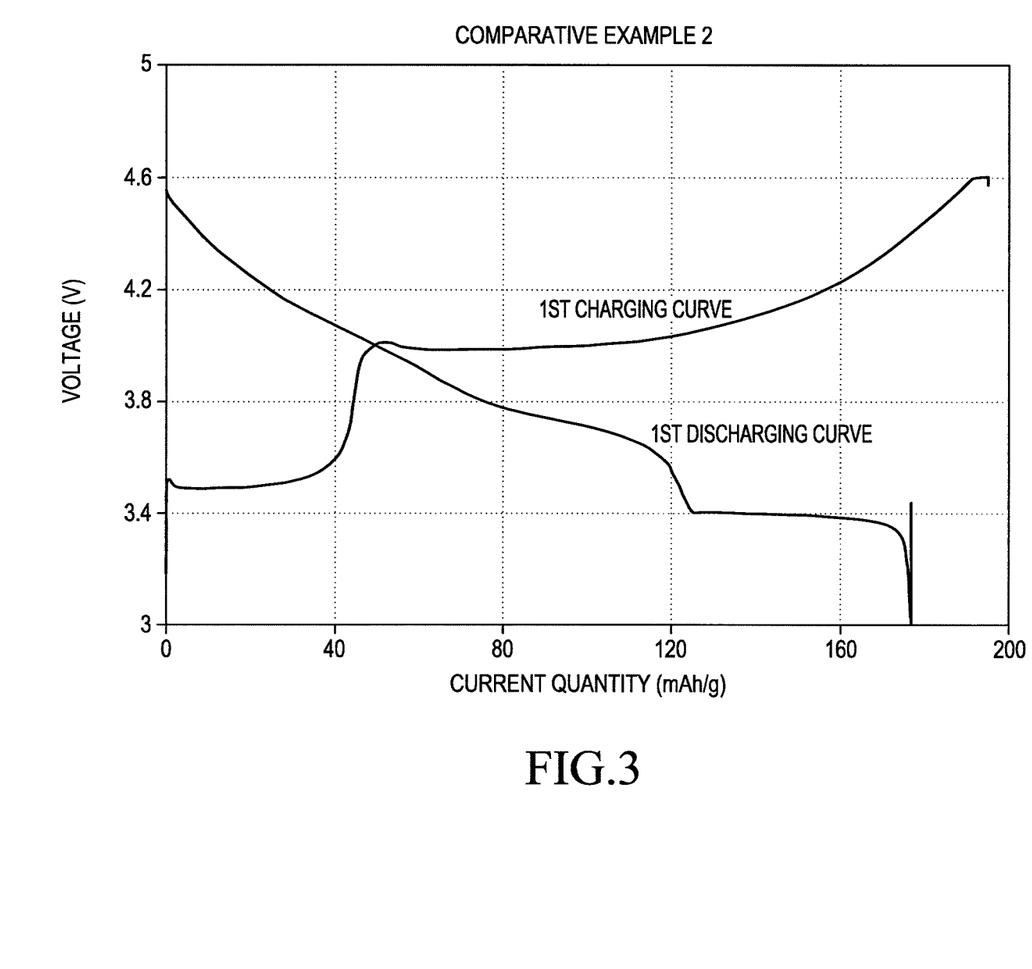
FIG. 3 is a graph showing tilts of a current-voltage change and a profile when a lithium secondary battery according to Comparative Example 2 of the present invention is discharged.
Figure 4:
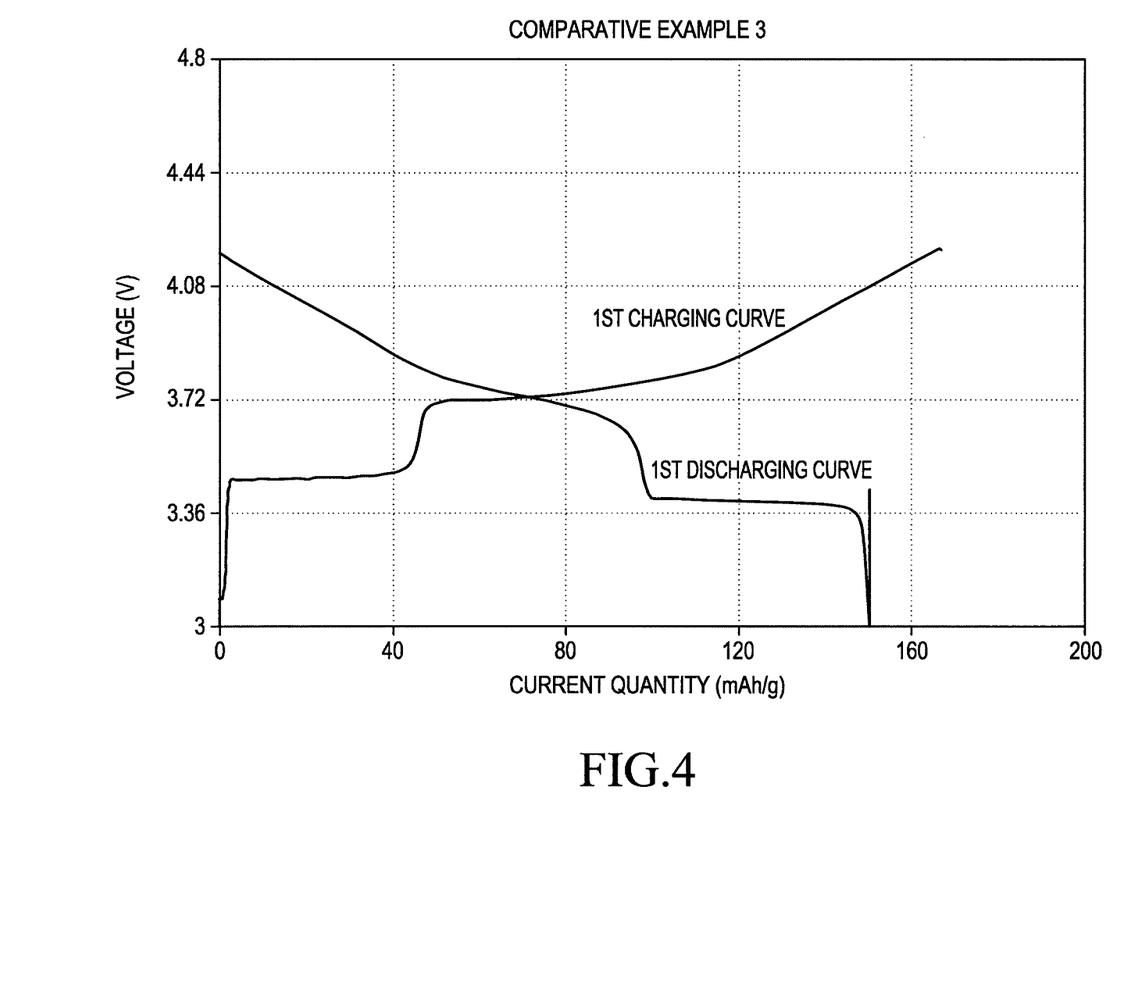
FIG. 4 is a graph showing tilts of a current-voltage change and a profile when a lithium secondary battery according to Comparative Example 3 of the present invention is discharged.

FIGS. 2 to 4 show the tilts of the current-voltage change and profiles in the 3 V to 4 V range when the secondary batteries according to the Comparative Examples is discharged.

With reference to FIGS. 1 to 4, it is noted that the secondary battery according to the Embodiment exhibits an even profile without a rapid voltage drop over 2 V to 4.5 V, unlike those of the secondary batteries according to Comparative Examples.

Thus, according to the present invention, the high capacity lithium secondary battery having excellent charging and discharging characteristics and stability and excellent output characteristics at a low voltage can be provided, and in particular, when the lithium secondary battery is used as a midsize or large battery used as a power source of an electric vehicle, or the like, it sufficiently satisfy the required conditions such as output characteristics, capacity, stability, and the like.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A lithium secondary battery comprising:
   a mixed positive electrode active material comprising a lithium manganese oxide of a layered structure represented by [Chemical Formula 1] shown below and a metal oxide having an olivine structure represented by [Chemical Formula 2] shown below and charged at a voltage of 4.6 V or higher based on a positive electrode potential, wherein the mixed positive electrode active material includes the metal oxide having the olivine structure in an amount of 10-40 wt %, and wherein the metal oxide having the olivine structure in the mixed positive electrode active material is coated with a conductive material;

$0.5Li_2MnO_3$-$0.5Li(Mn_{0.33}Ni_{0.33}Co_{0.33})O_2$    [Chemical Formula 1]

$LiFePO_4$    [Chemical Formula 2]

2. The lithium secondary battery of claim 1, wherein, in charging the lithium secondary battery at the voltage of 4.6 V or higher based on the positive electrode potential, the lithium secondary battery is charged in a formation operation, or in a few cycles or in every cycle following the formation operation.

3. The lithium secondary battery of claim 1, wherein the conductive material is a carbon-based material.

4. The lithium secondary battery of claim 1, wherein the mixed positive electrode active material further comprises any one or two or more lithium-containing metal oxides selected from the group consisting of a lithium cobalt oxide, a lithium nickel oxide, a lithium manganese oxide, a lithium cobalt-nickel oxide, a lithium cobalt-manganese oxide, a lithium manganese-nickel oxide, a lithium cobalt-nickel-manganese oxide, and an oxide formed by substituting these with other elements or formed by doping other element(s) therein.

5. The lithium secondary battery of claim 4, wherein the other element(s) are any one or two or more elements selected from the group consisting of Al, Mg, Mn, Ni, Co, Cr, V, and Fe.

6. The lithium secondary battery of claim 4, wherein the lithium-containing metal oxide is included to be 50 wt % or less over the total weight of the mixed positive electrode active material.

7. The lithium secondary battery of claim 1, wherein the lithium secondary battery comprises a positive electrode mix including a conductive material, a binder, and a filler, besides the mixed positive electrode active material.

8. The lithium secondary battery of claim 1, wherein the lithium secondary battery is used as a unit cell of a battery module, a power source of a midsize or large device.

9. The lithium secondary battery of claim 8, wherein the midsize or large device is a power tool; an electric vehicle including an electric vehicle (EV), a hybrid electric vehicle (HEV), and a plug-in hybrid electric vehicle (PHEV); an electric two-wheeled vehicle including an E-bike and an E-scooter; an electric golf cart; an electric truck; or an electric commercial vehicle or a power storage system.

10. A method for manufacturing a lithium secondary battery, the method comprising:
    fabricating a mixed positive electrode active material comprising a lithium manganese oxide of a layered structure represented by [Chemical Formula 1] shown below and a metal oxide having an olivine structure in an amount of 10-40 wt % represented by [Chemical Formula 2] shown below, wherein the fabricating of the mixed positive active material comprises coating the metal oxide having the olivine structure with a conductive material;
    manufacturing a lithium secondary battery including the mixed positive electrode active material; and
    a formation step of charging the lithium secondary battery at a voltage of 4.6 V or higher based on a positive electrode potential,
    wherein $0.5Li_2MnO_3$-$0.5Li(Mn_{0.33}Ni_{0.33}Co_{0.33})O_2$    [Chemical Formula 1]

$LiFePO_4$    [Chemical Formula 2]

11. The method of claim 10, wherein the formation operation is performed in every several cycles or in every cycle.

12. The method of claim 10, wherein the conductive material is a carbon-based material.

* * * * *